United States Patent
Veneshetty et al.

(10) Patent No.: US 11,015,323 B2
(45) Date of Patent: May 25, 2021

(54) SYSTEM AND METHOD FOR DETERMINING USAGE OF WORK IMPLEMENT

(71) Applicant: Caterpillar Inc., Deerfield, IL (US)

(72) Inventors: Arjun Veneshetty, Dunlap, IL (US); Joshua D. Reed, Galesburg, IL (US)

(73) Assignee: Caterpillar Inc., Peoria, IL (US)

( * ) Notice: Subject to any disclaimer, the term of this patent is extended or adjusted under 35 U.S.C. 154(b) by 307 days.

(21) Appl. No.: 16/269,783

(22) Filed: Feb. 7, 2019

(65) Prior Publication Data

US 2020/0256038 A1   Aug. 13, 2020

(51) Int. Cl.

| | |
|---|---|
| *E02F 9/26* | (2006.01) |
| *G06F 1/32* | (2019.01) |
| *G07C 3/04* | (2006.01) |
| *E02F 3/32* | (2006.01) |
| *G06F 1/3296* | (2019.01) |

(52) U.S. Cl.
CPC .......... *E02F 9/26* (2013.01); *E02F 3/32* (2013.01); *G06F 1/3296* (2013.01); *G07C 3/04* (2013.01)

(58) Field of Classification Search
CPC ............ E02F 3/32; E02F 3/963; E02F 9/205; E02F 9/26; E02F 9/267; G06F 1/3296; G07C 3/04; G07C 5/008; G07C 5/0841
See application file for complete search history.

(56) References Cited

U.S. PATENT DOCUMENTS

| | | | | |
|---|---|---|---|---|
| 4,442,494 | A * | 4/1984 | Fromson | G01N 3/58 340/680 |
| 6,085,583 | A * | 7/2000 | Cannon | E02F 3/435 37/413 |
| 6,363,632 | B1 * | 4/2002 | Stentz | E02F 3/437 37/414 |
| 7,113,105 | B2 * | 9/2006 | Sahm | E02F 9/26 172/4.5 |
| 9,464,408 | B2 | 10/2016 | Montgomery | |
| 10,190,288 | B2 * | 1/2019 | Matson | G01C 5/00 |
| 2004/0174130 | A1 * | 9/2004 | Inoue | B23Q 17/0961 318/569 |

(Continued)

FOREIGN PATENT DOCUMENTS

EP     1983305 A1     10/2008

*Primary Examiner* — Tyler J Lee
(74) *Attorney, Agent, or Firm* — Leydig, Voit & Mayer, Ltd.

(57) ABSTRACT

A system for tracking usage of a work implement includes a movement characteristic sensor, a wireless transmitter, and a controller. The controller is configured to determine whether movement of the work implement exceeds a movement characteristic threshold based upon the movement characteristic signals, increase a work implement usage time by a cycle time interval if the movement of the work implement exceeds the movement characteristic threshold, and transmit with a wireless transmitter on the work implement the work implement usage time and the unique identification number to a system remote from the work implement. Further, the controller is configured to sequentially operate in a standard power mode and in a low power mode, and while in the low power mode, power to at least one of the movement characteristic sensor and the wireless transmitter is terminated.

20 Claims, 4 Drawing Sheets

(56) References Cited

U.S. PATENT DOCUMENTS

| | | | |
|---|---|---|---|
| 2006/0090379 A1* | 5/2006 | Furem | E02F 9/267 37/443 |
| 2014/0100712 A1* | 4/2014 | Nomura | E02F 9/264 701/1 |
| 2016/0132033 A1* | 5/2016 | Kao | G05B 19/40937 700/291 |
| 2017/0292248 A1 | 10/2017 | Matson et al. | |
| 2017/0372534 A1 | 12/2017 | Steketee et al. | |
| 2018/0272491 A1* | 9/2018 | Yang | B23Q 17/2457 |

\* cited by examiner

SYSTEM AND METHOD FOR DETERMINING USAGE OF WORK IMPLEMENT

TECHNICAL FIELD

This disclosure relates generally to work implement measurement systems and, more particularly, to a system and method of measuring the usage of a work implement while differentiating between actual usage and transportation of the work implement.

BACKGROUND

Machines with work implements are used in various industries to perform desired operations such as moving, cutting, and breaking up material. The machines and work implements are often configured to readily permit changing the work implement being used by the machine. This permits an operator to use the optimum work implement for each operation. In other words, different sizes and/or configurations of each type of work implement may be provided for use with a machine, with the desired work implement selected depending on the characteristics of the material being operated upon, the characteristics of the machine, and the working environment.

For example, in some applications, the machine may be fitted and used with a bucket of a first capacity and/or shape and, in other applications, the machine may be fitted and used with a bucket of a second capacity and/or shape. As a result of the flexibility of using different work implements with a machine, the rate or frequency that each work implement is used may vary. For example, some work implements may be heavily used while others may be used infrequently.

Systems have been proposed for monitoring the actual usage of a work implement. For example, EP Patent Application No. 2 154 652 discloses a system for determining the work time of a work tool. The system includes a work tool movement sensor that produces signals indicative of movement of the work tool. A controller produces a signal indicative of the work time of the work tool as a function of the movement of the work tool.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for tracking usage of a work implement includes a movement characteristic sensor, a wireless transmitter, and a controller. The movement characteristic sensor is disposed on the work implement and configured to generate movement characteristic signals indicative of a movement characteristic of the work implement. The wireless transmitter is disposed on the work implement and configured to transmit signals from the work implement to a system remote from the work implement. The controller is configured to associate a unique identification number with the work implement, store a movement characteristic threshold, store a cycle time interval, and receive movement characteristic signals from the movement characteristic sensor. The controller is further configured to determine whether movement of the work implement exceeds the movement characteristic threshold based upon the movement characteristic signals, increase a work implement usage time by the cycle time interval if the movement of the work implement exceeds the movement characteristic threshold, and transmit with the wireless transmitter the work implement usage time and the unique identification number to a system remote from the work implement. Further, the controller is configured to sequentially operate in a standard power mode and in a low power mode, and while in the low power mode, power to at least one of the movement characteristic sensor and the wireless transmitter is terminated.

In another aspect, a method of tracking usage of a work implement, includes associating a unique identification number with the work implement, storing a movement characteristic threshold, storing a cycle time interval, receiving movement characteristic signals from a movement characteristic sensor, the movement characteristic signals being indicative of a movement characteristic of the work implement, and determining whether movement of the work implement exceeds the movement characteristic threshold based upon the movement characteristic signals. The method further includes increasing a work implement usage time by the cycle time interval if the movement of the work implement exceeds the movement characteristic threshold, transmitting, with a wireless transmitter disposed on the work implement, the work implement usage time and the unique identification number to a system remote from the work implement, and sequentially operating in a standard power mode and in a low power mode, and terminating power to at least one of the movement characteristic sensor and the wireless transmitter while operating in the low power mode.

In still another aspect, a machine includes a prime mover, a ground-engaging drive mechanism, a work implement, a movement characteristic sensor, a wireless transmitter, and a controller. The ground-engaging drive mechanism is operatively coupled to the prime mover to propel the machine. The work implement is operatively connected to the machine. The movement characteristic sensor is disposed on the work implement and configured to generate movement characteristic signals indicative of a movement characteristic of the work implement. The wireless transmitter is disposed on the work implement and configured to transmit signals from the work implement to a system remote from the work implement. The controller is configured to associate a unique identification number with the work implement, store a movement characteristic threshold, store a cycle time interval, and receive movement characteristic signals from the movement characteristic sensor. The controller is further configured to determine whether movement of the work implement exceeds the movement characteristic threshold based upon the movement characteristic signals, increase a work implement usage time by the cycle time interval if the movement of the work implement exceeds the movement characteristic threshold, and transmit with the wireless transmitter the work implement usage time and the unique identification number to a system remote from the work implement. Further, the controller is configured to sequentially operate in a standard power mode and in a low power mode, and while in the low power mode, power to at least one of the movement characteristic sensor and the wireless transmitter is terminated.

DETAILED DESCRIPTION

Figure 1:
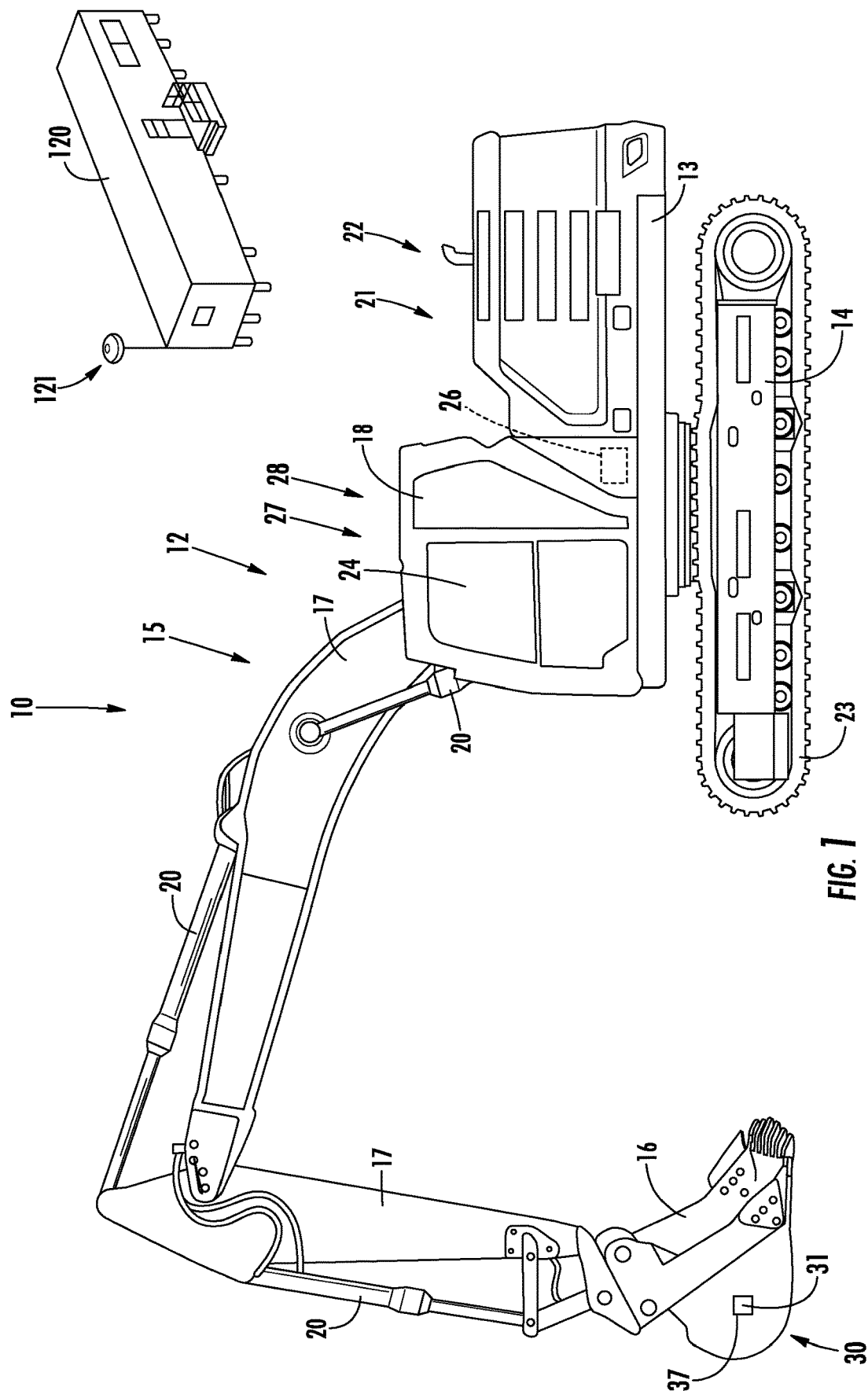
FIG. 1 depicts a side view of an excavator with which the principles disclosed herein may be used.

FIG. 1 depicts an exemplary machine 10 such as an excavator. However, the systems and features of the present disclosure may be used with any type of machine having a work implement including, for example, track-type tractors, loaders, motor graders, skid steers, dozers, backhoes, and the like.

The depicted machine 10 has multiple systems and components that cooperate to move material in a desired manner. The machine 10 may include an implement system 12 comprising a swing member or platform 13 rotatably disposed on an undercarriage 14, and a linkage assembly 15 including a work implement configured as a bucket 16. The linkage assembly 15 may include one or more linkage members 17 configured to move the bucket 16.

Bucket 16 and each linkage member 17 may be operatively connected to one or more actuators 20 such as hydraulic cylinders. The actuators 20 may be operated by a hydraulic system generally indicated at 21.

A prime mover 22 may provide power for the operation of the machine 10 including propulsion through ground engaging propulsion devices such as tracks 23 and the hydraulic system 21.

The machine 10 may include and be controlled by a machine control system 25 as shown generally by an arrow in FIG. 1 indicating association with the machine. The machine control system 25 may include an electronic control module or controller such as a machine controller 26 that controls the operation of various aspects of the machine 10 including the drivetrain and the hydraulic system 21. The machine controller 26 may receive input signals from an operator operating the machine 10 from within the cab 24 or off-board the machine through a wireless communications system 121.

The machine controller 26 may be an electronic controller that operates in a logical fashion to perform operations, execute control algorithms, store and retrieve data and other desired operations. The machine controller 26 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the machine controller 26 such as power supply circuitry, signal conditioning circuitry, driver circuitry, and other types of circuitry.

The machine controller 26 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the machine controller 26 may be implemented in hardware and/or software without regard to the functionality. The machine controller 26 may rely on one or more data maps relating to the operating conditions and the operating environment of the machine 10 and the work site that may be stored in the memory of controller. Each of these data maps may include a collection of data in the form of tables, graphs, and/or equations.

The machine control system 25 and the machine controller 26 may be located on the machine 10 and may also include components located remotely from the machine. The functionality of machine control system 25 may be distributed so that certain functions are performed at machine 10 and other functions are performed remotely.

The machine 10 may include a machine transmitter generally indicated at 27 and a machine receiver generally indicated at 28. The machine transmitter 27 and the machine receiver 28 may be a portion of the machine controller 26. The machine transmitter 27 and the machine receiver 28 may communicate wirelessly with other machines and systems including wireless communications system 121 of the command center 120.

Although depicted with the work implement configured as a bucket 16, the work implement may have any other configuration including a grapple, a hammer, or any other desired mechanism.

In order to track the actual usage, each work implement may be provided with a usage measurement system generally indicated at 30 in FIG. 1. Data reflecting the actual usage may be used for any desired purpose. In one embodiment, the actual usage may be used to monitor the amount of remaining useful life for each work implement. In another embodiment, the actual usage may be used to plan for future maintenance procedures. In still another embodiment, the actual usage may be used to determine variable charges for rental equipment.

Figure 2:
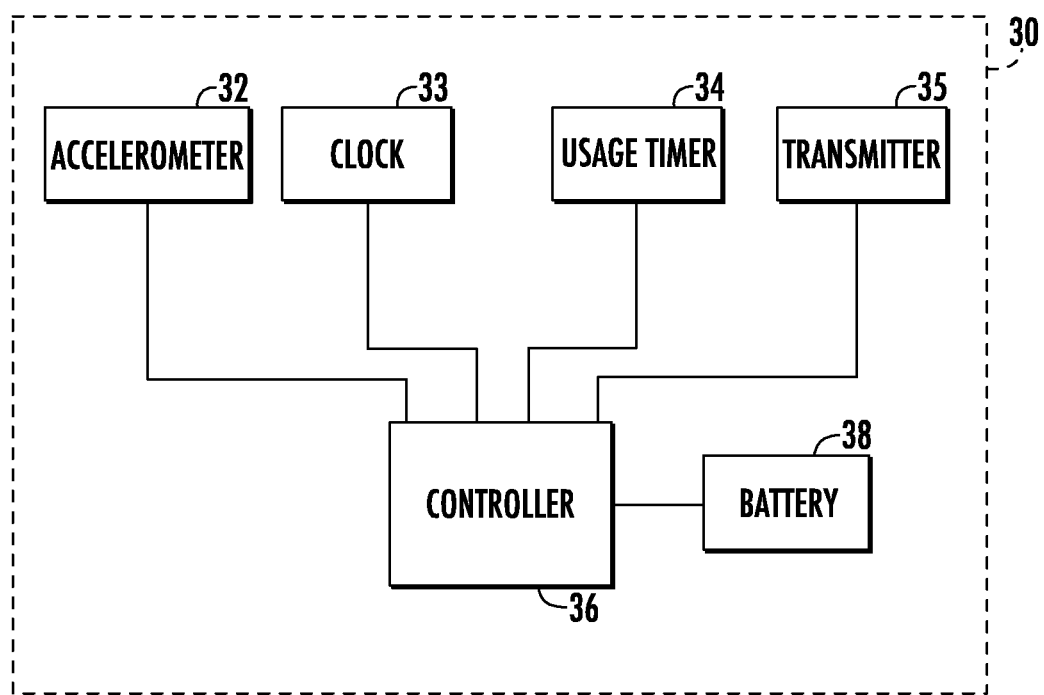
FIG. 2 depicts a block diagram of an embodiment of the usage measurement system as disclosed herein.

Referring to FIG. 2, the usage measurement system 30 may embody a usage measurement unit 31 (FIG. 1) that includes a movement characteristic sensor 32, a clock 33, a work implement usage timer 34, a wireless radio or transmitter 35 and a unit controller 36. The movement characteristic sensor 32 may be configured to generate movement signals or data indicative of movement of the component upon which the movement characteristic sensor is mounted.

In embodiments, the movement characteristic sensor 32 may be a multi-axis accelerometer such as a three-axis (x, y, z) accelerometer. The movement characteristic sensor 32 may have other configurations such as, alternatively or additionally, measuring rotational axes. For example, the movement characteristic sensor 32 may embody or comprise a six-axis or a nine-axis inertial motion sensor. The six-axis inertial motion sensor may combine a three-axis accelerometer with a three-axis gyroscope, while a nine-axis inertial motion sensor adds a three-axis compass or magnetometer. In addition, in some applications, the movement characteristic sensor 32 may measure fewer axes of acceleration including one or two. Further, the movement characteristic sensor 32 may take other forms provided that the measured movement will differentiate or permit differentiation between actual operation of the work implement and transportation of the work implement. In other words, the movement characteristic sensor 32 may take any form that generates data that may be used to reduce the likelihood of a false positive reading of actual usage or operation of the work implement.

The clock 33 may be configured to operate as a counter or otherwise permit the measurement of cycles of operation or timer intervals of the usage measurement system 30. The clock 33 may be a standalone component or the functionality thereof may be provided by the unit controller 36. In an embodiment, the timer intervals may be eight seconds long. Other timer intervals may be set or used as desired. As described in further detail below, the timer interval may be used to define the length of each operational cycle of the usage measurement system 30.

The work implement usage timer 34 may be configured to measure or track the amount of time of actual usage of the work implement. The work implement usage timer 34 may be a standalone component or the functionality thereof may be provided by the unit controller 36.

The wireless transmitter 35 may be configured to transmit information or data from on-board the usage measurement unit 31 to a location remote from the work implement. Such remote locations may include the machine receiver 28 of the machine 10 or another receiver off-board the usage measurement unit 31 such as that of a mobile device (e.g., a cell phone) or a receiver (not shown) of a communications system 121 remote from the machine 10. In some instances, a receiver near the usage measurement unit 31 (e.g., the machine receiver 28 of the machine) may be operatively connected to another transmitter (e.g., the machine transmitter 27) that may be used to transmit information or data to the receiver remote from the machine 10.

The wireless transmitter 35 may implement or utilize any desired system or protocol including any of a plurality of communications standards. Examples of wireless communications systems or protocols that may be used by the wireless transmitter 35 include a wireless personal area network such as Bluetooth® LE or BLE or another personal area network or a local area network such as IEEE 802.11b, 802.11g, 802.11p, 802.15.4(ZigBee), WiFi Direct, LTE Direct or, a cellular network, or any other system or protocol for data transfer. Other wireless communications systems and configurations are contemplated.

The unit controller 36 may be identical or similar in structure and operation to the machine controller 26 described above and the description is not repeated herein. The unit controller 36 may be located within the usage measurement unit 31 and, if desired, may also include components located remotely from the usage measurement unit such as on the machine 10, on a mobile device, or at a remote location. If desired, the functionality of the unit controller 36 may be distributed so that certain functions are performed on the usage measurement unit 31 and other functions are performed remotely. The system characteristics of the usage measurement system 30 may be stored within or accessed by the unit controller 36 or any other controller such as machine controller 26.

In an embodiment, the usage measurement system 30 may be self-contained within and the operations thereof performed exclusively on-board the usage measurement unit 31 by the unit controller 36. Alternatively, operations of the usage measurement system 30 may be performed by the unit controller 36 in combination with another controller such as the machine controller 26. Accordingly, references herein to the usage measurement system 30 may refer to systems, components, and operations of any of the any machine control system 25, the usage measurement system 30, or any combination thereof, and references herein to a controller may refer to systems, components, and operations of the machine controller 26, the unit controller 36, a remote controller, or any combination thereof.

The usage measurement unit 31 may be disposed within a housing 37 (FIG. 1) on each work implement. The usage measurement unit 31 may be powered by a relatively small battery 38 (FIG. 2) such as a coin shaped or coin cell battery.

In operation, the usage measurement system 30 may be configured to differentiate between movement caused by actual use of the work implement and movement due to the work implement being transported and also record or track the amount of actual usage. To do so, the movement characteristic sensor 32 may be selected or configured so that movement characteristic signals from the sensor may be analyzed by the unit controller 36 in a manner to reduce the likelihood of false positive readings with respect to work implement usage.

As stated above, the configuration or type of movement characteristic sensor 32 of the usage measurement system 30 may be selected based upon the type of work implement. In the depicted embodiment, the work implement is a bucket 16 and the movement characteristic sensor 32 is configured as a three-axis accelerometer. The unit controller 36 may be configured to receive acceleration signals from the accelerometer and analyze such signals to determine whether the work implement is actually being used or is merely being transported. To do so, the unit controller 36 may monitor the acceleration along each axis and determine whether a sufficient change in acceleration has occurred along at least any two of the axes. If the acceleration along at least two of the axes exceeds an acceleration threshold, the movement of the work implement may be deemed to be operational movement.

More specifically, the unit controller 36 may receive movement characteristic signals in the form of acceleration signals from the accelerometer and determine a maximum acceleration along each axis for a specified time period or interval. In embodiments, the maximum acceleration along each axis may be recorded or stored for each interval. In other embodiments, other characteristics of the movement of the movement characteristic sensor 32 (e.g., average acceleration, change in slope of the acceleration, or other aspects of the movement) may be evaluated. In the depicted embodiment, after each measurement interval, the unit controller 36 may compare the current maximum acceleration for that interval to the prior maximum acceleration stored or recorded during the prior measurement interval to determine the change in acceleration along each axis. The unit controller 36 may compare the difference in acceleration along each axis to the acceleration threshold. If the difference in acceleration of the movement characteristic sensor 32 along any two of the axes exceeds the movement characteristic threshold (e.g., the acceleration threshold), the unit controller 36 may deem the movement to be operational movement rather than transportation movement. In one example, the acceleration threshold may be 2 g (i.e., two times the acceleration of gravity) along each axis. In other examples, the acceleration threshold may be as low as 1.5 g or as high as 8 g, depending on the type of work implement and the level of accuracy desired. In some instances, the acceleration threshold may not be the same along each axis.

Inasmuch as the usage measurement unit 31 may be powered by a battery 38 and it may be desirable to minimize the need to replace such batteries, it may be desirable to implement functionality into the usage measurement system 30 to minimize or reduce the amount of power used by the system. Accordingly, the unit controller 36 may be configured to operate the usage measurement system 30 alternatively or sequentially between a standard power mode and a low power mode in which power usage is reduced through control of the activities of the certain components of the usage measurement system 30.

More specifically, when operating in the low power mode, the unit controller 36 may be configured to limit or control the power to either or both of the movement characteristic sensor 32 and the wireless transmitter 35 while maintaining power to the clock 33, the work implement usage timer 34, and the memory used to store the maximum acceleration of the prior measurement interval. In some embodiments, this may result in maintaining power to all or certain aspects of the unit controller 36 while terminating or blocking power to either or both of the movement characteristic sensor 32 and the wireless transmitter 35. In an embodiment, all aspects of the movement characteristic sensor 32, the clock 33, the work implement usage timer 34, the wireless transmitter 35, and the unit controller 36 may be fully functional when operating in the standard power mode. In other embodiments, only one of the movement characteristic sensor 32 and the wireless transmitter 35 may receive power at a time while in the standard power mode.

To control when the movement characteristic sensor 32 is operational or active and when it is inactive, the unit controller 36 may control the timing of power delivery to the movement characteristic sensor 32. More specifically, in order to limit the amount of power used by the usage measurement system 30, the unit controller 36 may periodically terminate or prevent power from being supplied to the movement characteristic sensor 32. To do so, the unit controller 36 may be configured to operate a counter based upon the clock 33, compare the counter to the cycle time interval, and change to the standard power mode upon the expiration of the cycle time interval. In the standard power mode, the power may then be provided to the movement characteristic sensor 32.

In an embodiment in which the movement characteristic sensor 32 generates signals without power, unit controller 36 may be configured to ignore signals generated by the movement characteristic sensor 32 other than at desired intervals. More specifically, in some instances, the movement characteristic sensor 32 may generate movement signals without power but the unit controller 36 may only analyze the movement signals at desired times in order to reduce or limit the amount of power used by the usage measurement system 30.

Since the power to components of the usage measurement system 30 may be periodically terminated to reduce power usage, the usage measurement system may be configured to periodically sample movements of the usage measurement unit 31 and use such samples to approximate the movement of the work implement over each interval of time in which the power has been terminated.

In an embodiment, the unit controller 36 may be configured to monitor signals from the movement characteristic sensor 32 only during recurring, relatively short measurement intervals spaced apart by a predetermined cycle time interval.

As an example, the measurement intervals may be two milliseconds in length, the cycle time intervals may be eight seconds in length, and the movement characteristic threshold or acceleration threshold may be 2 g. In other words, every eight seconds, the unit controller 36 may receive movement characteristic signals from the movement characteristic sensor 32 for a period of two milliseconds. Other measurement intervals and other cycle time intervals are contemplated.

The unit controller 36 may determine whether the difference between the maximum acceleration for the current two millisecond measurement interval and the prior two millisecond measurement interval exceeds the 2 g acceleration threshold along at least two of the three axes measured by the accelerometer. If the acceleration difference along two axes exceeds the acceleration threshold, the unit controller 36 may increase the work implement usage timer 34 by an amount equal to the length of the measurement interval. In the foregoing example, the work implement usage timer 34 may be increased by eight seconds.

From the foregoing, it may be understood that power may only be provided to the accelerometer for two milliseconds out of every eight second cycle time interval. Other time periods or intervals at which power may be provided to the accelerometer are contemplated. As a result, a substantial savings in power may be achieved as compared to providing continuous power to the accelerometer.

To control when the wireless transmitter 35 is operational or active and when it is inactive, the unit controller 36 may control the timing of power delivery to the wireless transmitter 35. More specifically, in order to limit the amount of power used by the usage measurement system 30, the unit controller 36 may periodically terminate or prevent power from being supplied to the wireless transmitter 35. As stated above, the unit controller 36 is configured to receive acceleration signals from the accelerometer, determine whether the work implement is being actually used, and adjust the work implement usage timer 34 as necessary based upon the sensed movement. After each measurement cycle, the unit controller 36 may provide power to the wireless transmitter 35 and transmit the current level of actual usage of the work implement to a receiver spaced from the usage measurement unit 31. After such transmission, the unit controller 36 may terminate the power to the wireless transmitter 35.

From the foregoing, it may be understood that power may only be provided to the wireless transmitter 35 for a long enough period to transmit the desired information. Such time period may be approximately 200 milliseconds out of every eight second cycle time interval. Other time periods or intervals at which power may be provided to the wireless transmitter 35 are contemplated. As a result, a substantial savings in power may be achieved as compared to providing continuous power to the wireless transmitter 35.

Figure 3:
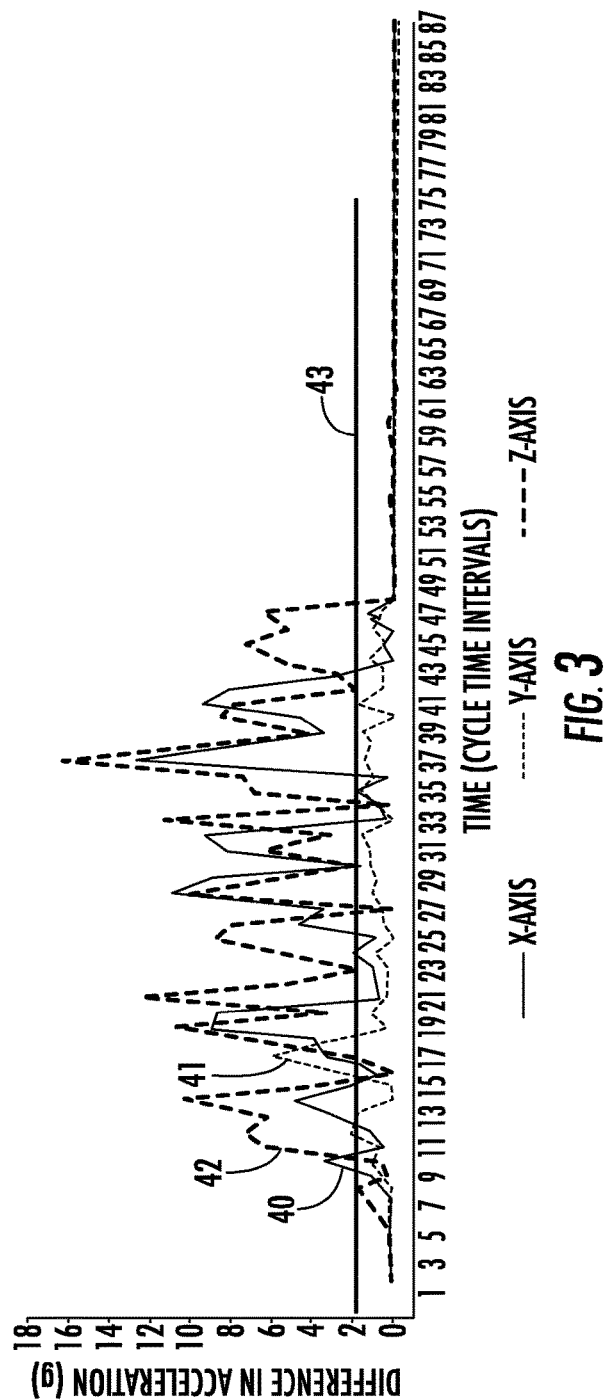
FIG. 3 depicts an exemplary graph of change in acceleration along the x-, y-, and z-axes as a function of cycle time intervals.

Referring to FIG. 3, an exemplary graph depicts the difference in acceleration between adjacent measurement intervals (i.e., current measurement interval and prior measurement interval) as a function of time expressed as cycle time intervals. The acceleration difference along each of the axes (i.e., x, y, z) is depicted as a different line with the difference in acceleration along the x-axis is depicted at line 40, the difference in acceleration along the y-axis is depicted at line 41, and the difference in acceleration along the z-axis is depicted at line 42. The movement characteristic threshold is depicted at line 43.

Figure 4:
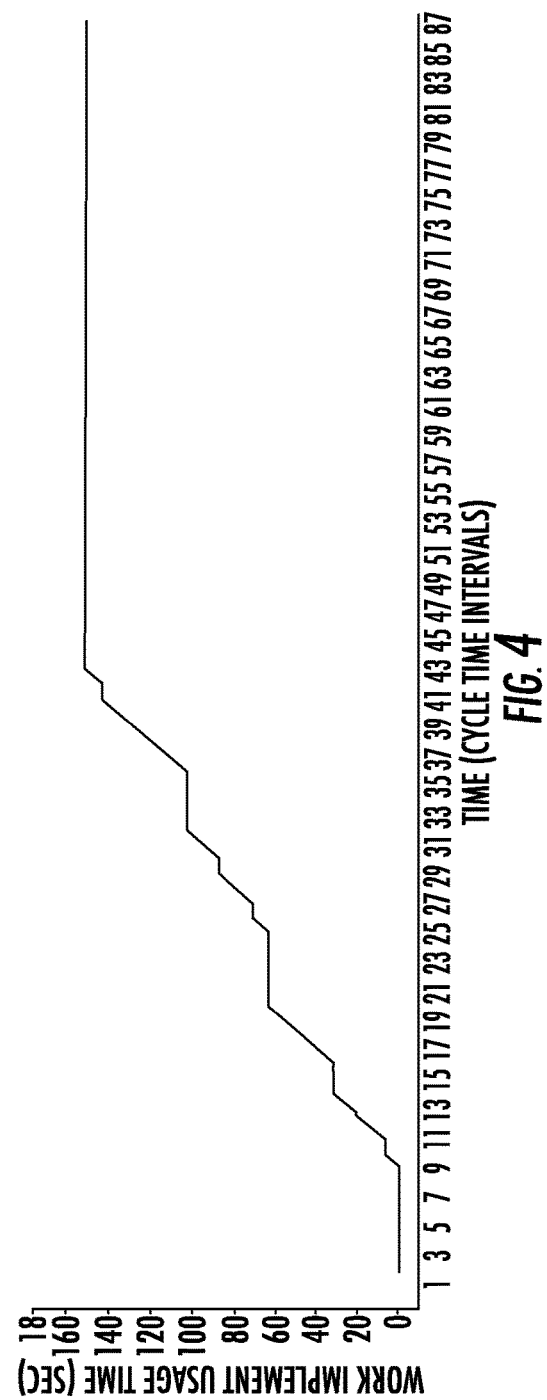
FIG. 4 depicts a depicts an exemplary graph of the work implement usage time as a function of cycle time intervals.

FIG. 4 depicts an exemplary graph of the work implement usage timer based upon the data of the exemplary graph in FIG. 3. For example, the acceleration difference of two axes does not exceed the movement characteristic threshold 43 until interval 9. At interval ten, the acceleration difference along the x-axis 40 and the z-axis 42 exceeds the movement characteristic threshold 43. Accordingly, the work implement usage timer is increased by eight seconds at interval 10. However, at interval 11, the difference in acceleration along the x-axis 40 decreases below the movement characteristic threshold 43. Accordingly, the work implement usage timer remains constant between intervals 10 and 11.

At intervals 12-15, the difference in acceleration along each of the x-axis 40 and the z-axis 42 is at above the movement characteristic threshold 43 and thus the work implement usage timer is increased by eight seconds at each of those intervals. At interval 16, the difference in acceleration along each of the x-axis 40 and the z-axis 42 is below the movement characteristic threshold 43. Accordingly, even though the difference in acceleration along the y-axis 42 is above the movement characteristic threshold 43, the work implement usage timer is not increased at interval 16. Between interval 17 and interval 43, the difference in acceleration along at least two of the axes periodically exceeds the movement characteristic threshold 43 and the work implement usage timer is increased over some of the intervals. However, after interval 43, the difference in acceleration along at least two of the axes no longer exceeds the movement characteristic threshold 43 and therefore the work implement usage timer remains constant. This is despite the difference in acceleration along the z-axis 42 exceeding the movement characteristic threshold 43 between intervals 43 and 47.

Various alternative configurations are contemplated. Although described with the unit controller determining the maximum acceleration during each measurement interval and determining a difference in acceleration between the current measurement interval and the prior measurement interval, the controller may not determine the actual values of the acceleration or difference in acceleration but rather may compare or manipulate the signals without determining the corresponding acceleration. Further, although described with the usage measurement system 30 contain within the usage measurement unit 31, aspects of the usage measurement system may be disposed outside or remote from the usage measurement unit. For example, the unit controller 36 may transmit the movement characteristic data received from the movement characteristic sensor 32 to a controller spaced from the unit controller. In such case, the unit controller 36 may not be required to store the prior movement characteristic data nor perform the analysis of the movement characteristic data. Such storage and analysis may be performed remote from the usage measurement unit 31.

In addition, rather than storing the usage time within the work implement usage timer 34 of the usage measurement unit 31, the work implement usage timer 34 may be disposed remote from the usage measurement unit 31 with the usage time stored at such a remote location.

Still further, the usage measurement system 30 may be configured to permit one or more of the characteristics of system to be set or stored within the unit controller 36 remotely. These characteristics may include the acceleration thresholds for each axis of the accelerometer (or the thresholds for other axes or elements of other types of movement characteristic sensors 32), the length of the measurement intervals, and/or the length of the timer intervals. The usage measurement system 30 may be configured with default system characteristics values. However the system characteristics values may be changed remotely by providing signals to the unit controller 36 on-board the usage measurement unit 31. Changing the system characteristic values may be desirable when the usage measurement unit 31 is mounted on a work implement other than a default work implement (e.g., a bucket 16).

To provide this functionality, the usage measurement unit 31 may include an on-board receiver to receive information or data or the wireless transmitter 35 may be configured as a transceiver capable of transmitting and receiving information or data. Signals may be transmitted from the machine controller 26 through the wireless transmitter 35 or through a transmitter of a mobile device to the unit controller 36 through the receiver on-board the usage measurement unit 31.

In addition, the usage measurement system 30 may be configured to be reset to show zero actual usage such as if the usage measurement unit 31 is moved from one work implement to another. To do so, a reset command may be sent to the unit controller 36 in any desired manner. In one embodiment, a reset command may be sent to the on-board receiver from the machine controller 26 through the wireless transmitter 35 or through a transmitter of a mobile device.

INDUSTRIAL APPLICABILITY

The industrial applicability of the systems described herein will be readily appreciated from the forgoing discussion. The foregoing discussion is applicable to systems used with machines with work implements in which it is desirable to determine or track the amount of usage of the work implement. Such work sites may include a mining site, a landfill, a quarry, a construction site, a roadwork site, or any other area in which work implements are used.

Figure 5:
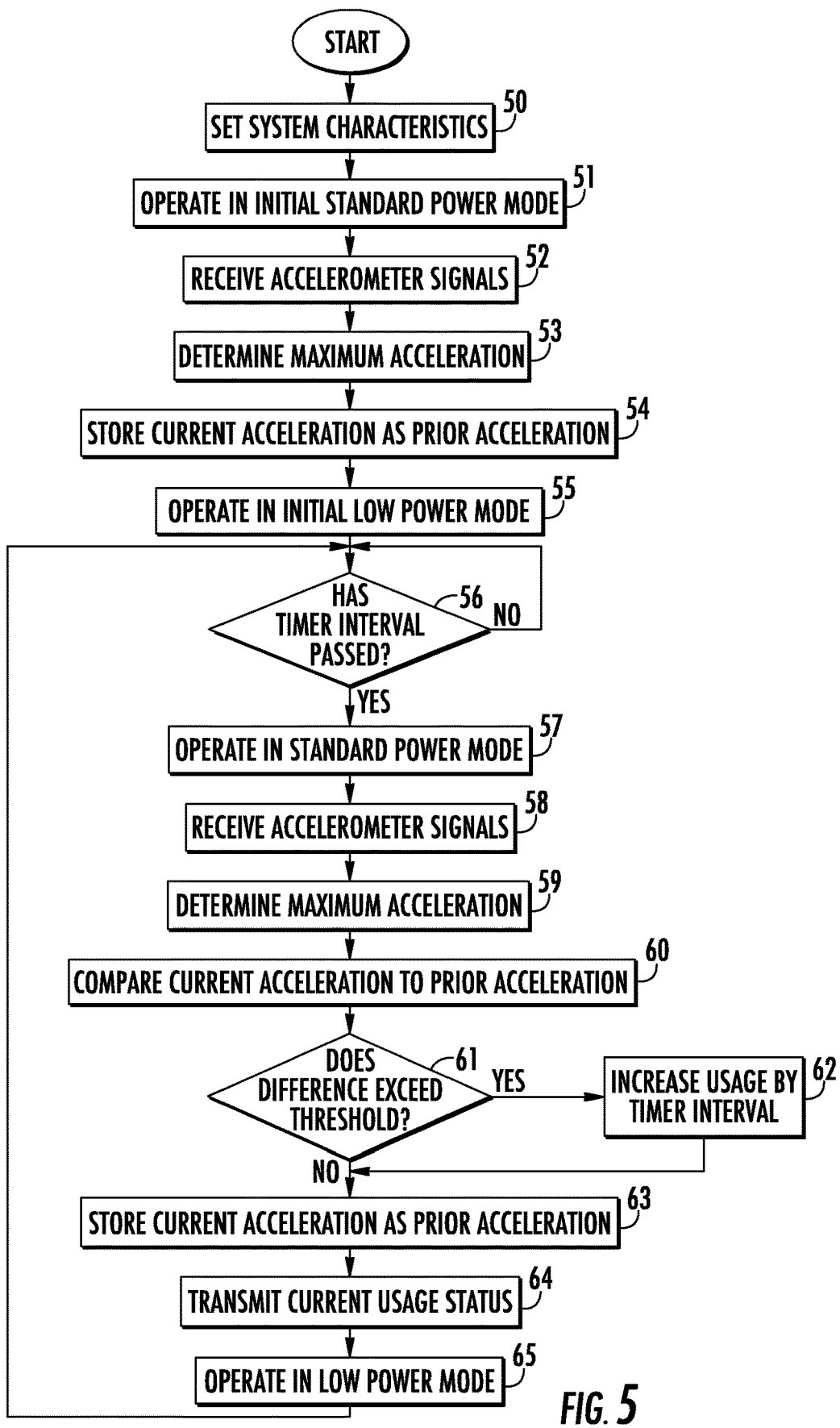
FIG. 5 depicts a flowchart illustrating the operation of the usage measurement system disclosed herein.

Referring to FIG. 5, a flowchart of the operation of a process for determining the usage of a work implement is depicted. At stage 50, the characteristics of the usage measurement system 30 may be set or stored within the unit controller 36. Such system characteristics may include the length of the accelerometer measurement intervals, the length of the timer intervals, and the acceleration thresholds for each axis of the accelerometer. The system characteristics may further include setting the initial usage as desired, which would typically be zero. In addition, the timing of when and for how long to provide power to the accelerometer and the wireless transmitter 35 may also be set or stored. A unique identification number may be associated with each work implement and stored within the unit controller 36.

At stage 51, the usage measurement system 30 may be operated in an initial standard power mode. In doing so, power may be provided to each of the components other than the wireless transmitter 35.

The unit controller 36 may receive at stage 52 the accelerometer signals from the accelerometer. At stage 53, the unit controller 36 may determine the desired characteristics of the acceleration data. In one embodiment, the desired characteristics may be the maximum acceleration along each axis during the measurement interval.

The unit controller 36 may store at stage 54 the current maximum acceleration along each axis as the prior maximum acceleration for use in subsequent calculations. At stage 55, the usage measurement system 30 may be operated in an initial low-power mode. In doing so, power to the accelerometer may be terminated.

At decision stage 56, the unit controller 36 may determine whether the timer interval has passed. In other words, the unit controller may determine whether the desired time period between measurement intervals has passed. If the cycle time interval has not passed, decision stage 56 may be repeated until the interval has passed. Once the cycle time interval has passed at decision stage 56, the usage measurement system 30 may be operated in the standard power mode at stage 57. In some instances, power may not be provided simultaneously to each of the accelerometer and the wireless transmitter 35.

At stage 58, the unit controller 36 may receive the accelerometer signals from the accelerometer. The unit controller 36 may determine at stage 59 the desired characteristics of the acceleration data such as the maximum acceleration along each axis during the measurement interval.

At stage 60, the unit controller 36 may compare the current maximum acceleration along each axis to the stored or prior maximum acceleration. The unit controller 36 may determine at decision stage 61 whether the difference in maximum acceleration along at least two axes exceeds the acceleration threshold for each of those axes. If the difference in maximum acceleration along at least two axes exceeds the acceleration threshold for each axis, the unit controller 36 may increase at stage 62 the actual usage stored within the work implement usage timer by a length of time equal to the timer interval.

Regardless of whether the difference in maximum acceleration exceeded the acceleration thresholds at decision stage 61, the unit controller 36 may store at stage 63 the current maximum acceleration along each axis as the prior maximum acceleration for use in subsequent calculations. At stage 64, the wireless transmitter 35 may transmit the current status of the work implement usage timer together with the unique identification number associated with the work implement to a receiver disposed remotely from the usage measurement unit 31. In some instances, the information may be transmitted to the machine receiver 28 and then transmitted from the machine 10 to a system remote from the machine by machine transmitter 27.

At stage 65, the usage measurement system 30 may return to the low-power mode. In doing so, power to the accelerometer and wireless transmitter 35 may be terminated. In some instances, the termination of power to the accelerometer and the wireless transmitter 35 may not be simultaneous. Stages 56-65 may then be repeated until the work implement is removed from service.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for tracking usage of a work implement, comprising:
    a movement characteristic sensor disposed on the work implement and configured to generate movement characteristic signals indicative of a movement characteristic of the work implement;
    a wireless transmitter disposed on the work implement and configured to transmit signals from the work implement to a system remote from the work implement; and
    a controller configured to:
        associate a unique identification number with the work implement;
        store a movement characteristic threshold;
        store a cycle time interval;
        receive movement characteristic signals from the movement characteristic sensor;
        determine whether movement of the work implement exceeds the movement characteristic threshold based upon the movement characteristic signals;
        increase a work implement usage time by the cycle time interval if the movement of the work implement exceeds the movement characteristic threshold; and
        transmit with the wireless transmitter the work implement usage time and the unique identification number to a system remote from the work implement; and
    wherein the controller is further configured to sequentially operate in a standard power mode and in a low power mode, in the low power mode, power to at least one of the movement characteristic sensor and the wireless transmitter is terminated.

2. The system of claim 1, wherein the movement characteristic sensor is an accelerometer.

3. The system of claim 2, wherein the movement characteristic sensor comprises a multi-axis accelerometer.

4. The system of claim 3, wherein the movement characteristic threshold comprises an acceleration threshold along each axis of the accelerometer.

5. The system of claim 4, wherein the controller is further configured to increase the work implement usage time by the cycle time interval if the movement of the work implement exceeds the acceleration threshold along any two axes of the accelerometer.

6. The system of claim 5, wherein the controller is further configured to determine a current maximum acceleration along each axis during a measurement interval and a determination of whether the movement of the work implement exceeds the acceleration threshold is based upon the current maximum acceleration during the measurement interval.

7. The system of claim 6, wherein the controller is further configured to store a prior maximum acceleration along each axis during a prior measurement interval and the determination of whether the movement of the work implement exceeds the acceleration threshold is based upon a difference between the current maximum acceleration and the prior maximum acceleration.

8. The system of claim 4, wherein the acceleration threshold is identical along each axis of the accelerometer.

9. The system of claim 1, wherein the controller does not receive movement characteristic signals from the movement characteristic sensor when the controller is in the low power mode.

10. The system of claim 1, wherein the movement characteristic sensor does not generate movement characteristic signals when the controller is in the low power mode.

11. The system of claim 1, wherein the wireless transmitter does not transmit the work implement usage time and the unique identification number to a system remote from the work implement when the controller is in the lower power mode.

12. The system of claim 1, wherein while in the low power mode, the controller is configured to operate a counter, compare the counter to the cycle time interval, and change to the standard power mode upon the expiration of the cycle time interval.

13. The system of claim 12, wherein after transmitting the work implement usage time and the unique identification number to the system remote from the work implement, the controller is configured to change to the low power mode.

14. The system of claim 1, wherein the movement characteristic sensor, the wireless transmitter and the controller are battery powered.

15. A method of tracking usage of a work implement, comprising:
 associating a unique identification number with the work implement;
 storing a movement characteristic threshold;
 storing a cycle time interval;
 receiving movement characteristic signals from a movement characteristic sensor disposed on the work implement, the movement characteristic signals being indicative of a movement characteristic of the work implement;
 determining whether movement of the work implement exceeds the movement characteristic threshold based upon the movement characteristic signals;
 increasing a work implement usage time by the cycle time interval if the movement of the work implement exceeds the movement characteristic threshold;
 transmitting, with a wireless transmitter disposed on the work implement, the work implement usage time and the unique identification number to a system remote from the work implement; and
 sequentially operating in a standard power mode and in a low power mode, and terminating power to at least one of the movement characteristic sensor and the wireless transmitter while operating in the low power mode.

16. The method of claim 15, wherein the movement characteristic sensor comprises a multi-axis accelerometer, the movement characteristic threshold comprises an acceleration threshold along each axis of the accelerometer, and further comprising increasing the work implement usage time by the cycle time interval if the movement of the work implement exceeds the acceleration threshold along any two axes of the accelerometer.

17. The method of claim 16, further comprising determining a current maximum acceleration along each axis during a measurement interval and determining whether the movement of the work implement exceeds the acceleration threshold based upon the current maximum acceleration during the measurement interval.

18. The method of claim 17, further comprising storing a prior maximum acceleration along each axis during a prior measurement interval and the step of determining whether the movement of the work implement exceeds the acceleration threshold is based upon a difference between the current maximum acceleration and the prior maximum acceleration.

19. The method of claim 15, after transmitting the work implement usage time and the unique identification number to the system remote from the work implement, operating in the low power mode.

20. A machine, comprising:
 a prime mover;
 a ground-engaging drive mechanism operatively coupled to the prime mover to propel the machine;
 a work implement operatively connected to the machine;
 a movement characteristic sensor disposed on the work implement and configured to generate movement characteristic signals indicative of a movement characteristic of the work implement;
 a wireless transmitter disposed on the work implement and configured to transmit signals from the work implement to a system remote from the work implement; and
 a controller configured to:
  associate a unique identification number with the work implement;
  store a movement characteristic threshold;
  store a cycle time interval;
  receive movement characteristic signals from the movement characteristic sensor;
  determine whether movement of the work implement exceeds the movement characteristic threshold based upon the movement characteristic signals;
  increase a work implement usage time by the cycle time interval if the movement of the work implement exceeds the movement characteristic threshold; and
  transmit with the wireless transmitter the work implement usage time and the unique identification number to a system remote from the work implement; and
 wherein the controller is further configured to sequentially operate in a standard power mode and in a low power mode, in the low power mode, power to at least one of the movement characteristic sensor and the wireless transmitter is terminated.

* * * * *